United States Patent Office 3,362,925
Patented Jan. 9, 1968

3,362,925
PROCESS FOR PEPTIZING POLY-
CHLOROPRENE LATEX
Philip Aldwyn Jenkins, Ashtead, Surrey, Anthony Archibald Sparks, Epsom Downs, Surrey, and Robert Charles Moore, Sutton, Surrey, England, assignors to The Distillers Company, Limited, Edinburgh, Scotland, a British company
No Drawing. Filed Apr. 13, 1964, Ser. No. 359,411
Claims priority, application Great Britain, Apr. 26, 1963, 16,450/63
5 Claims. (Cl. 260—29.7)

ABSTRACT OF THE DISCLOSURE

The peptization of sulfur-modified polychloroprene latex is improved by using in addition to the peptizing mixture of tetraethyl thiuram disulfide and dimethyl ammonium dimethyl dithiocarbamate, an oxidation product of a substituted or unsubstituted thiourea or isothiourea or their mixture. The oxidation product may be present as the ammonium salt or the alkali salt or a hydrogen substituted derivative.

---

This invention relates to the use of additional compounds to improve known processes for the peptization of sulphur modified polychloroprene latex and to the polychloroprene rubber obtained from the latex.

By the term sulphur modified polychloroprene latex is meant throughout this specification any synthetic rubber latex formed by polymerising 2-chloro-1,3-butadiene or 2-chloro-1,3-butadiene and a copolymerisiable monomer or monomers in the presence of sulphur. By the term peptization is meant throughout this specification the breakdown of the sulphur modified polychloroprene to give a more plastic product.

Many processes and agents for peptizing polychloroprene latex are possible, for instance British Patent No. 529,838.

An object of the present invention is to improve known peptizing processes.

According to the present invention the process for improving the peptization of sulphur modified polychloroprene latex comprises carrying out the peptization process in the presence of an oxidation product of a substituted or unsubstituted thiourea or isothiourea or a mixture thereof, said oxidation product as herein defined.

The oxidation product can be present as its ammonium or alkali metal salts or its hydrogen substituted derivative.

By an oxidation product of a thiourea or isothiourea is meant a product which can be represented by the formulae (1)  $X-S(O)_n$ where X represents a group having the structure $$\begin{array}{c} R \diagdown \diagup R_1 \\ N \\ \diagdown C- \\ \diagup \\ N \\ R_3 \diagup \diagdown R_2 \end{array}$$

and $n$ is 1 to 3 inclusive or (2)  $Y-S(O)_n-M$ where Y represents a group having the structure $$\begin{array}{c} R \diagdown \diagup R_1 \\ N \\ \diagdown C- \\ \diagup \\ N \\ | \\ R_2 \end{array}$$

M represents hydrogen, the ammonium ion or an alkali metal, $n$ is 1 to 3 inclusive and in (1) and (2) R, $R_1$, $R_2$ and $R_3$ can be the same or different and represent hydrogen, an alkyl, aryl or acyclic group and any two of these groups attached to different nitrogen atoms can together form a cyclic group with these nitrogen atoms. Examples of these cyclic groups are $$\begin{array}{cc} C-N & N \\ | \diagdown & \diagdown \\ | \quad C- \text{ or } & C- \\ | \diagup & \diagup \\ C-N & N \end{array}$$

(3)          Y—S—S—Y where Y represents the same structure as given in (2).

The preferred oxidation product is thiourea dioxide or its ammonium or alkali metal salt.

The oxidation products can be prepared separately or in the presence of the sulphur modified polychloroprene latex by reacting a substituted or unsubstituted thiourea or isothiourea with an oxidizing agent such as hydrogen peroxide.

The oxidation products can be added to the sulphur modified polychloroprene latex in the form of an aqueous emulsion or dispersion either with peptizing agents or during the peptizing reaction. Suitable proportions by weight of the preferred oxidation product, thiourea dioxide or its ammonium or alkali metal salt, in relation to the dry rubber in the latex are 3% or less and preferably 1% or less.

The preferred peptization processes in which these oxidation products can be used employ the following peptizing agents; a thiuram disulphide, a xanthogen disulphide or a sulphenamide or mixtures of these compounds with one another or with a dialkyl dithiocarbamate such as for example dimethyl ammonium dimethyl dithiocarbamate, or an inorganic alkaline material and/or a secondary amine.

The process according to the present invention is illustrated in the following examples.

Example 1

A sulphur modified polychloroprene latex of pH 11.3 was prepared using well known emulsion polymerisation procedures in which a minor proportion of sulphur was present in the emulsion, a wood rosin was used as soap and potassium persulphate was used as the polymerization initiator.

The polymerisation was terminated at the desired conversion level by addition of the peptizing mixture of tetraethyl thiuram disulphide/dimethyl ammonium dimethyl dithiocarbamate given in Table 1 as the "control." The latex was sampled immediately after addition of the peptizing mixture and thiourea dioxide added to the sample. The sample 1 and control latex were maintained at 40° C. and the Mooney viscosity of the rubber obtained from the latex determined at 1, 3, 5 and 8 hours after addition of the peptizing mixture. The results are listed in Table 1.

These results show the improvement in peptization given by the presence of thiourea dioxide.

TABLE 1

| Agent added to peptize latex | | Mooney viscosity (ML4'/100° C.) after peptization (hours) | | | |
|---|---|---|---|---|---|
| | | 1 | 3 | 5 | 8 |
| Control | 1.6% tetraethyl thiuram disulphide/ 0.25% dimethyl ammonium dimethyl dithiocarbamate. | 92 | 45 | 41 | 33 |
| Sample 1 | 1.6% tetraethyl thiuram disulphide/ 0.25% dimethyl ammonium dimethyl dithiocarbamate/1% thiourea dioxide. | 38 | 33 | 32 | 32 |

*Example 2*

A sulphur modified polychloroprene latex pH 11.3 was prepared using well known emulsion polymerization procedures in which a minor proportion of sulphur was present in the emulsion, a wood rosin used as soap and potassium persulphate as the polymerization initiator.

The polymerization was terminated at the desired conversion level by the addition of a peptizing mixture comprising tetraethyl thiuram disulphide and dimethyl ammonium dimethyl dithio carbamate, as shown in Table 2 under the heading "control." The latex was sampled after adding the peptizing mixture and a dispersion of the oxidation product of N,N'-dibutyl thiourea was added to one sample of latex. This oxidation product was prepared by suspending N,N'-dibutyl thiourea (18.8 grams) in water (100 millilitres) and stirring with hydrogen peroxide (23 millilitres:100 vols.) for two hours. The organic material was extracted with chloroform, the chloroform solution filtered free from insoluble material, washed with water, dried and evaporated under reduced pressure to give a yellow syrup (17.1 grams).

The sample (Table 2, Sample 2) of latex containing the oxidation together with control latices were maintained at 40° C. and the Mooney viscosity of the rubber obtained from these latices determined at the times shown in Table 2 where the results obtained are presented.

TABLE 2

| Agent added to peptize latex | | Mooney viscosity (ML4'/100° C.) time after addition of oxidation product (hours) | | | | | |
|---|---|---|---|---|---|---|---|
| | | 0 | 0.5 | 1.5 | 3 | 6 | 10 |
| Control | 1.6% tetraethyl thiuram disulphide/ 0.25% dimethyl ammonium dimethyl dithiocarbamate. | 75 | 52 | 43 | 43 | 36 | 29 |
| Sample 2 | 1.6% tetraethyl thiuram disulphide/ 0.25% dimethyl dithiocarbamate/ 1% oxidation product of N,N' dibutyl thiourea. | | 19 | 20.5 | 22 | 19 | |

These results demonstrate the improvement in peptization which is brought about by the presence of the oxidation product of N,N'-dibutyl thiourea.

We claim:

1. A process for improving the peptization of sulphur modified polychloroprene latex which comprises carrying out the peptization with a peptizing mixture of tetraethyl thiuram disulfide and dimethyl ammonium dimethyl ammonium dimethyl dithiocarbamate and in the presence of an oxidation product of a member of the group consisting of a thiourea, isothiourea and mixtures thereof wherein the oxidation product is represented by any one of the following formulae:

(1) X—S(O)$_n$ where X represents a group having the structure

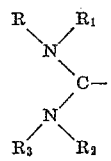

and $n$ is 1 to 3 inclusive.

(2) Y—S(O)$_n$—M where Y represents a group having the structure

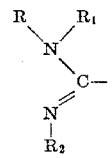

$n$ is 1 to 3 inclusive, M represents a member of the group consisting of hydrogen, the ammonium ion and an alkali metal and in Formulae 1 and 2, R, R$_1$, R$_2$ and R$_3$ represent a radical of the group consisting of hydrogen, alkyl, aryl and acyclic radicals and any two of these radicals attached to different nitrogen atoms can together form a cyclic group with these nitrogen atoms.

(3) Y—S—S—Y where Y represents a group having the structure defined in Formula 2.

2. A process as claimed in claim 1 wherein the oxidation product is present as its ammonium or alkali metal salt.

3. A process as claimed in claim 1 wherein the oxidation product is present as its hydrogen substituted derivative.

4. A process as claimed in claim 1 wherein the oxidation product is thiourea dioxide.

5. A process as claimed in claim 1 wherein the proportion by weight of oxidation product present in relation to the dry rubber is 1% or less.

References Cited

UNITED STATES PATENTS 3,235,527  2/1966  Sparks _____ 260—29.7

JOSEPH L. SCHOFER, *Primary Examiner.*

H. I. CANTOR, W. HAMROCK, *Assistant Examiners.*